Dec. 14, 1965    LE ROY S. DE MART    3,222,948
TRANSLATIONAL DRIVE MECHANISM
Filed May 14, 1962    4 Sheets-Sheet 2

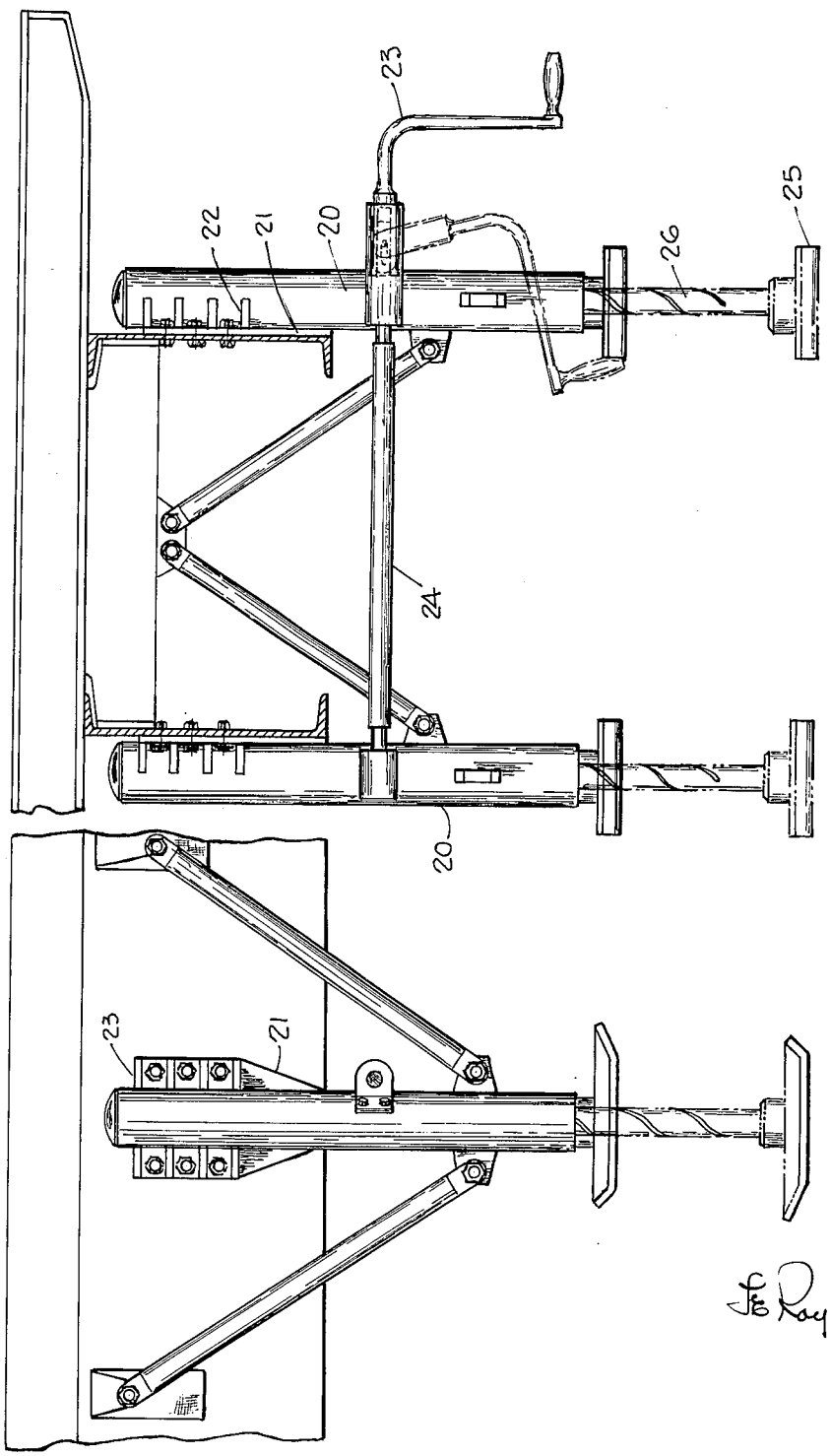

LeRoy S. DeMart
INVENTOR.

Dec. 14, 1965  LE ROY S. DE MART  3,222,948
TRANSLATIONAL DRIVE MECHANISM
Filed May 14, 1962  4 Sheets-Sheet 3
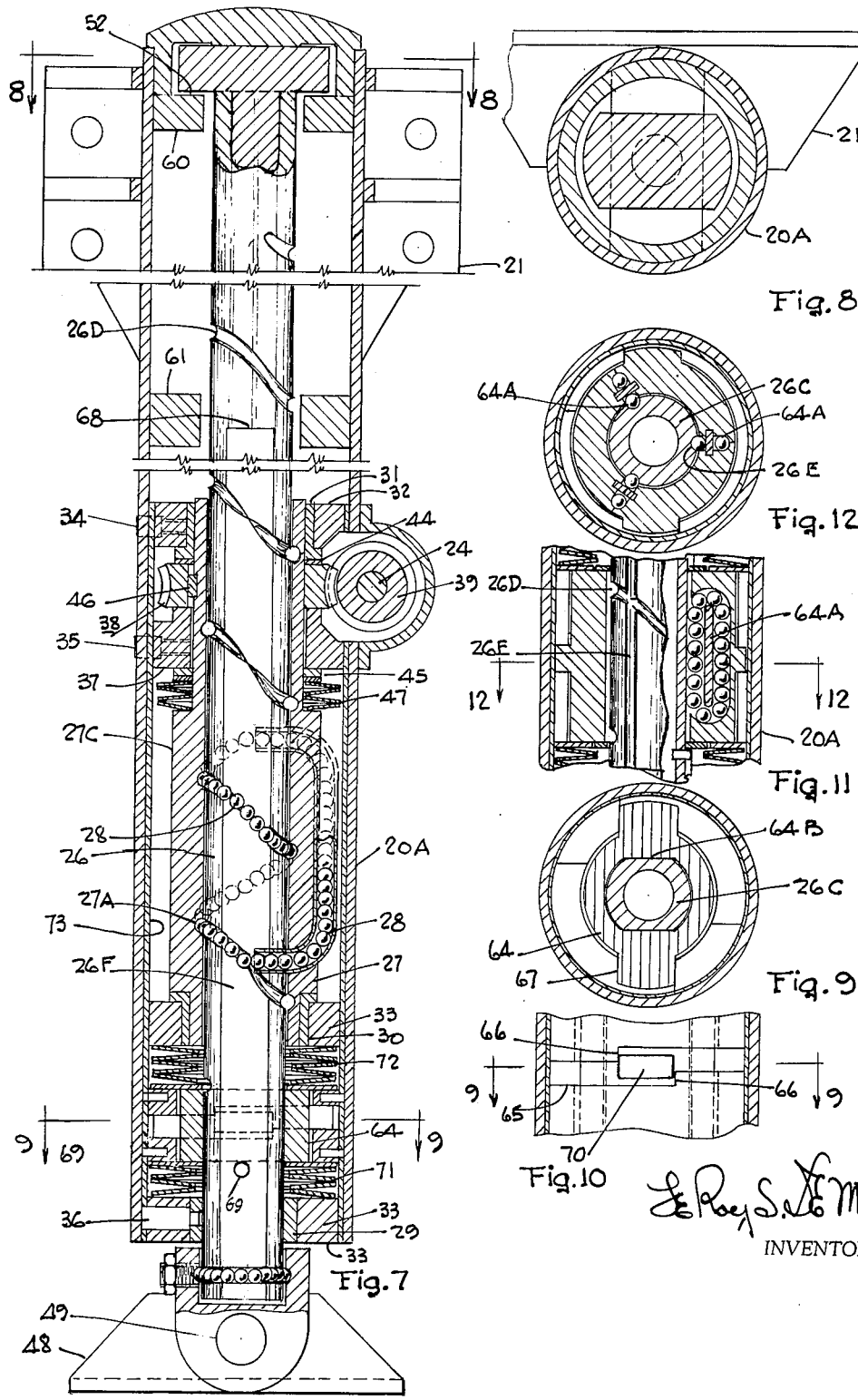
LeRoy S. De Mart
INVENTOR.

Dec. 14, 1965    LE ROY S. DE MART    3,222,948
TRANSLATIONAL DRIVE MECHANISM
Filed May 14, 1962    4 Sheets-Sheet 4
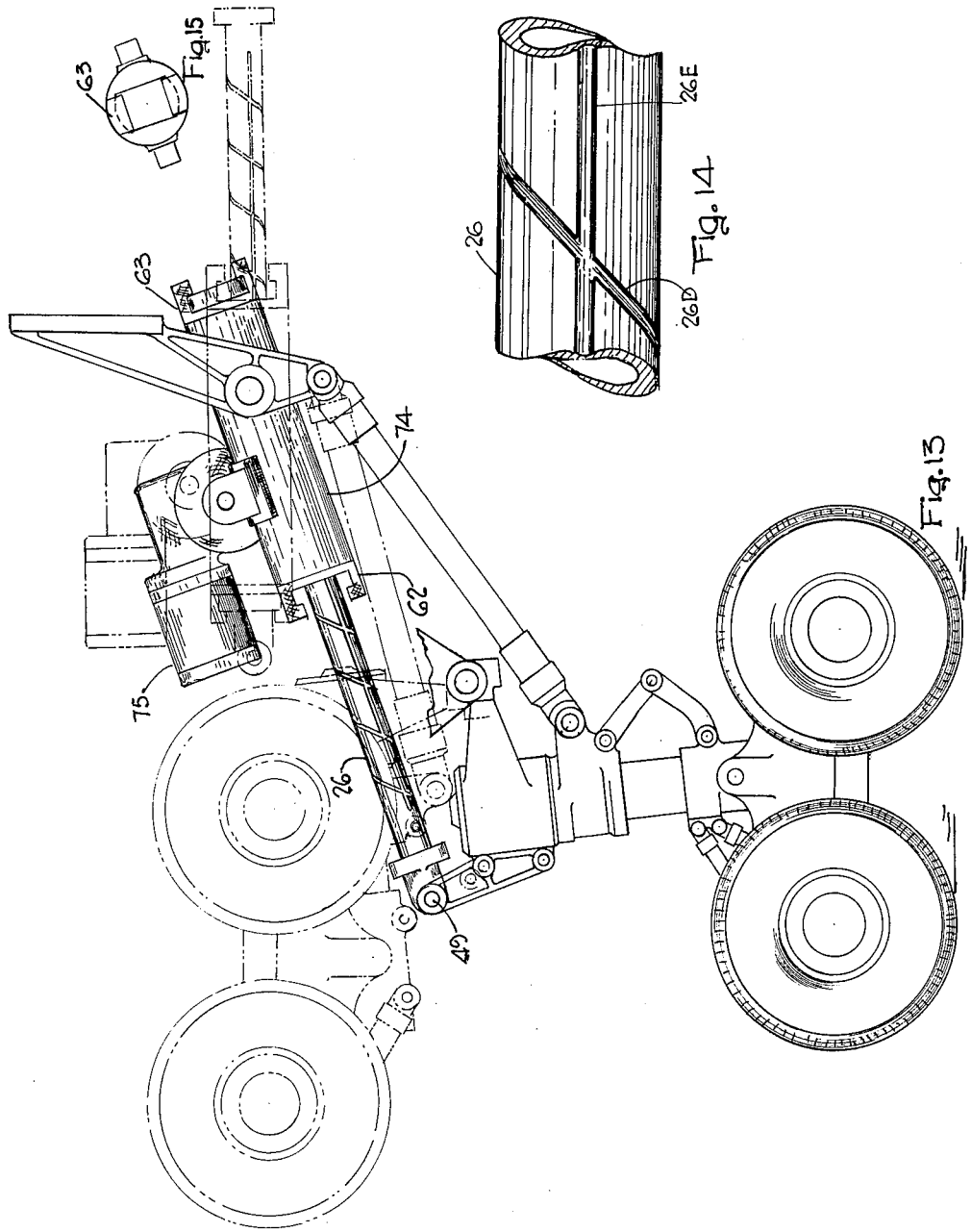
LeRoy S. DeMart
INVENTOR.

United States Patent Office 3,222,948
Patented Dec. 14, 1965

3,222,948
TRANSLATIONAL DRIVE MECHANISM
Le Roy S. DeMart, Lancaster, Ohio
Filed May 14, 1962, Ser. No. 194,412
19 Claims. (Cl. 74—424.8)

This invention relates to translational drive mechanisms such as are used in landing gears and more particularly to an improvement in those employing ball screw arrangements. The present application is a continuation-in-part of my copending application Serial No. 797,677 filed Mar. 6, 1959, now Patent No. 3,046,808.

The translation drive mechanism of the present invention, although not restricted thereto, is particularly useful in landing gears for supporting semi-trailers, and the like, of the variety used to haul loads on highways. Such a landing gear supports the semi-trailer when the tractor is removed for use elsewhere or when the semi-trailer is set down for loading, unloading or storage. The translational drive mechanism has other uses, however.

In order that an automotive tractor be most useful it must be possible to disengage it from any load-hauling trailer to which it may be attached. Inasmuch as the tractor serves as the front support of a semi-trailer only when attached, such a landing gear as that herein disclosed becomes the support means for the front of the semi-trailer when the tractor is detached. It is necessary to support the front of the semi-trailer at such height that it may be easily hitched and unhitched by the operation of the fifth wheel catch, when the tractor is moved to and from the coupled positioning in the conventional manner. The limits of vertical travel of the landing gear must be correct for the storage and hauling positions respectively.

Generally, such a landing gear is rigidly attached to the underframe of the semi-trailer near the forward end just clear of the space required for the tractor unit. It is usually hand-operated by cranking. Turning the crank extends a bearing shoe or shoes to a predetermined position so that the landing gear legs are of a desired length, either to support the semi-trailer when standing alone or to clear the road when the trailer is in use. The load on the landing gear customarily bears on the actuating screw threads, and external locking means are employed to prevent collapse of the unit while in use. In those employing a screw actuator of a recirculating ball type, the load rests directly on the balls when the landing gear is supporting the trailer.

To overcome the disadvantages of the above mentioned construction, I provide an improved ball screw actuated landing gear in which the load, when the landing gear is in normal use supporting the trailer, does not rest entirely on the balls in the ball screw. Also the load supported by the landing gear securely locks the landing gear against collapse.

My improved construction relieves the recirculating ball screw parts both of static loads and of vibration which in the past has had a tendency to peen and injure the contacting surfaces. The service to which such landing gears are applied is particularly severe when semi-trailers are hauled on railroad cars, in so-called "piggy back" transportation. In this usage, vibration and shock tend not only to destroy the ball groove surfaces but also the balls of recirculating ball type supports, unless a large number of extra balls and unduly heavy designs are employed in the assembly, at greatly increased cost. An important object of the present invention, therefore, is to completely eliminate such severe loadings of the recirculating ball screw portions, thereby greatly increasing the life of such parts and enabling the use of smaller and less expensive assemblies with superior performance.

Another object is to provide an improved mechanism of the indicated character which by the mere turning of a crank or shaft in one direction will automatically move not only to and from the extended positions, but also to and from a supplemental supporting position in which abutment parts are effective to relieve the loadings upon the ball screw elements.

In accordance with this invention, the foregoing objects and other features and advantages are attained by a translational drive mechanism comprising essentially one or more supporting legs, each having an actuator in the form of an operating screw and nut, disposed between the supporting post or leg and a guided extendable member, the latter member being arranged to turn and lock at each end of its longitudinal travel when the driving means is energized by turning in one direction to extend the extendable member and by turning in the opposite direction to retract the extendable member, and which transfers the load from the actuating means to the leg and the extendable member when in the fully extended or retracted position.

Another object of the invention is to provide improved means including a combination of helically motivated recirculating ball screw driving means and longitudinally circulatable ball type keying means, the overall and combined effect of which is to greatly reduce friction of the parts, while despite the attainment of such very low friction characteristics, the balls are relieved of harmful influences and loadings which might tend to injure them except during actual periods of actuation.

Other objects and advantages will be apparent upon consideration of the present disclosure in its entirety. In the drawing:

FIGURE 1 is an elevational view of a landing gear for use with a fragmentarily illustrated semi-trailer, taken looking longitudinally of the vehicle, and showing the legs in both the retracted and extended positions;

FIGURE 2 is a similar view from one side;

FIGURE 3 is a longitudinal sectional elevation of one of the legs;

FIGURE 7 is a sectional view similar to FIGURE 3, showing a modified construction;

Figures 4, 5, 6, 11A:
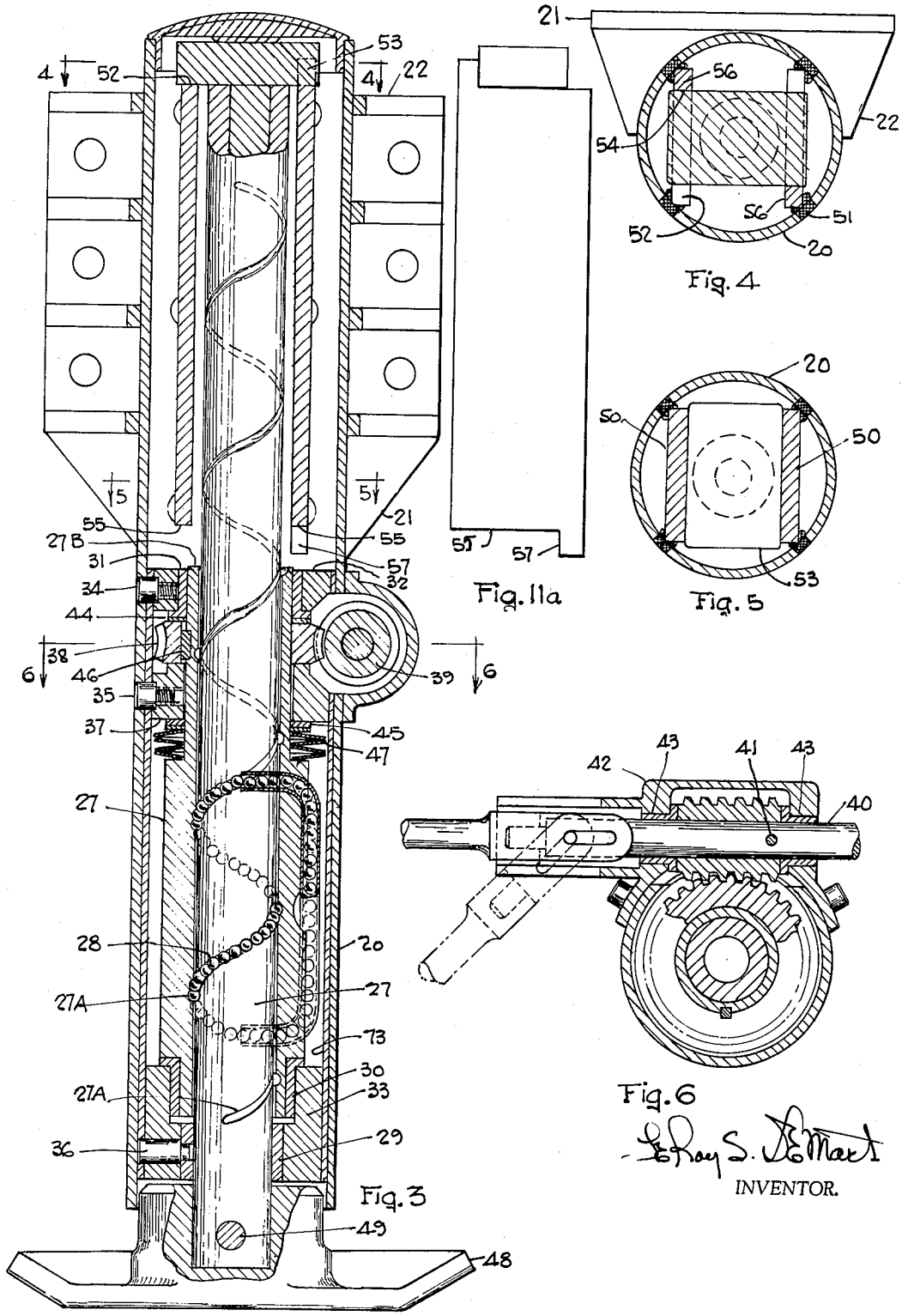
FIGURE 4 is a sectional view taken substantially on the line 4—4 of FIGURE 3 and looking in the direction of the arrows.
FIGURE 5 is a cross sectional view taken substantially on the line 5—5 of FIGURE 3 and looking in the direction of the arrows, but with the abutment plate in the position it occupies when the leg assembly is partially extended.
FIGURE 6 is a cross section taken substantially on the line 6—6 of FIGURE 3.

FIGURES 8 and 9 are cross sectional views taken substantially on the lines 8—8 and 9—9 respectively, of FIGURE 7 and looking in the direction of the arrows;

FIGURE 10 is a partial sectional elevational view of one side showing the portion of the construction of FIGURE 7 substantially at the same elevation as is indicated by the line 9—9;

FIGURE 11 is a cross sectional view taken at a position corresponding to the line 9—9 of FIGURE 7, but showing a modified construction;

FIGURE 11a is a side elevation view of a guide plate;

FIGURE 12 is a cross sectional view of the modified construction shown in FIGURE 11;

FIGURE 13 is a side elevational view of a landing gear for an aircraft, illustrating another important usage of my invention;

FIGURE 14 is an enlarged fragmentary side elevational view of the ball screw employed in the mechanisms illustrated in FIGURES 11–13; and FIGURE 15 is an end view of FIGURE 14.

Referring now to the drawings and particularly to the embodiment of FIGURES 1-6, wherein the invention is illustrated as suitable for use on semi-trailers, such usage ordinarily comprises two duplicate leg assemblies, as shown in FIGURE 1. Description of one will suffice for an understanding of the invention. Each leg includes a cylindrical casing 20 the upper end of which is rigidly secured to the chassis frame of the trailer or semi-trailer by means including plates and gusset assemblies 21. A crank 23 is provided and an interconnected operating shaft 24 permits extending and retracting both legs at once. A screw shaft 26 forms the extendable part of the leg and is longitudinally actutable into and out of the open lower end of the cylinder 20 and carries at its lower end a shoe 25 on which the trailer load is supported when the shaft is fully extended. Shaft 26 is shown retracted in FIGURE 3. In this embodiment a helical ball raceway 26 is cut in the outer surface of the shaft 26 and coacts with a ball nut 27 of the recirculating ball type. Nut 27 is rotatably supported at its lower and upper ends in bearings 30 and 31. The recirculating balls are designated 28. The operation of such components is well known. A smooth bearing 29 is provided at the lower end of the cylinder 20 engaging the shaft 26. Bearings 29, 30 and 31 are held in annular rings 32 and 33 rigidly secured in the inner casing tube 73 of the cylinder as by pins 36 and screws 34 and 35, which also hold the entire assembly in the cylinder. Screws 35 also support an annular ring 37 which locates worm gear 38 with respect to the cylinder and in mesh with worm 39 fast on shaft 24 to which it is secured by pin 41. Housing 42 and bearing means 43 cooperate to hold the shaft 40 in alignment in the respective jack leg assemblies constituting the two legs of the landing gear. Thrust bearings 44 and 45 are provided for the worm gear and worm gear housing. A key 46 secures worm gear 38 against rotation with respect to ball nut 27, but permits limited longitudinal travel of the nut 27 with respect to the gear when the axial load of the trailer structure 22 deflects the Belleville springs 47 when the trailer is set down on the bearing shoe 48.

Keying and gating plates 50, parallel to one another and extending longitudinally within the cylinder 20 are rigidly secured in cylinder 20 by welds 50 or other suitable means. Top surface portions 52 of the plates 50 form abutments to cooperate with a combined keying and abutment plate 53 secured to the top of shaft 26. Lug-like stop portions 56 also project upwardly from plates 50 to limit rotation of the plate 53 and so locate the parts when the leg screw shaft 26 is retracted that the plate 53 overlies the surfaces 52 at the upper ends of plates 50. Bottom surface portions 55 of keying plates 50 are similarly provided with lug portions 57 which limit rotation of the plate 53 when the leg is extended downwardly. When the leg shaft 26 is so extended downwardly to the limit of its extended position, the plate 53 is below the surfaces 55 but is not below the lugs 57, and at such time the final torque applied to the nut 27 in the projecting direction, since this also applies torque to the shaft, causes plate 53 to turn to a position in which it underlies the surfaces 55, and is located in such transverse positioning by the lug portions 57.

Load of the trailer compresses the Belleville springs 47 and such load is transmitted through plates 50 to plate 53 and then directly through shaft 26 and shoe 48 to the ground, so that there is no loading on the balls 28. As brought out in FIGURES 4 and 5, the plate 53 is rectangular and is narrow enough to slide between plates 50 when turned to one position, and to overlie or underlie such plates when turned transversely to engage the lugs 56 or 57. In FIGURE 4 the combined keying and abutment plate 53 is shown in the locked retracted position, plate 53 being turned crosswise of and overlying the keying plates 50 so that any axial load on the extensible leg shaft member 26 in an outward direction will be transmitted to the upper surfaces 52 of plates 50.

In operation, assuming the leg is retracted, turning crank 23 rotates the worm 39 and worm gear 38. Ball nut 27 first rotates the shaft 26 to turn plate 53 from the transverse position to the slidable position shown in FIGURE 5, in which latter slidable position it is also arrested by the lug means 56 or 57, and then further rotation of the nut actuates the shaft longitudinally to the other extreme or projected position. Upon reaching such limit of longitudinal travel, continued rotation of the gears again turns the plate 53 to the transverse position, as explained above. The plates 50 and the lug-like or stepped end configuration thereof will be seen to constitute gated blocking portions normally restricting angular rotation of the extensible screw shaft but positioned so that at the ends of the axial travel of the shaft, the supplemental load-supporting portions defined by plate 53 and coacting end abutment surfaces 52, 55 of plates 50 may move to axially overlapping relation. Any longitudinal motion of plate 53 due to a load on the trailer compresses Belleville springs 47, and places the load upon such abutment surfaces without increasing the load on the ball screw parts.

As will be understood, the translational drive mechanisms of my invention may include variations while achieving the same movement and operational results. A second such embodiment is shown in FIGURES 7-9.

Parts in these views are similar to those already described and are designated by like reference numerals. The plates 50 of this embodiment are replaced by rigid abutment and supporting lug members 60 and 61 longitudinally spaced in the cylinder 20a. The abutments 60 and 61 perform load-supporting functions similar to the upper and lower surfaces of the plates 50 of the first described embodiments. The plate 53a, similar to the plate 53, can be turned from the position shown in FIGURES 7 and 8, wherein it overlies the abutments 60, when the foot is retracted, to support the shaft leg and foot structure independently of the balls in the retracted position, while when fully projected downwardly the plate can similarly be turned to underlie the abutments 61, so that the weight of the supported trailer or other load is transmitted through the cylinder 20 and lugs 21 and plate 23a directly to the leg shaft member 26 and the foot 48 independently of the balls.

The keying of the shaft to guide it longitudinally and prevent turning during its travel between the two extreme overlying and underlying positions just described, is effected by a keying or guide nut or plate 64 slidably but non-rotatively overfitted on the shaft in and near the bottom of the cylinder and coacting with a gated collar-like hollow cylindrical member 65 surrounding the same and fast in the cylinder. The member 64 is provided with radially extending lug portions 70 which project outwardly into stepped keying slot portions 66 in collar 65. Lugs 70 and the stepped portions of the gated slots 66 are so interrelated that the stepped portions only permit vertical movement of the keying member 64 when the shaft 26 is in the angular position which corresponds to the transverse positioning of plate 53A, that is, the position in which the plate may overlie the lugs 60 or alternatively may underlie the lugs 61. It will be noted that the shaft 26 is provided with flats 26F which slidably key the same in a conformably contoured aperture 64B in the plate 64. Shaft 26 may thus slide freely through the member 64 at all times except when the plate 53A is turned to one of the transverse positionings at its extreme limits of travel.

In place of the flats 26F, straight longitudinal ball races may be formed in the exterior of the shaft 26, as indicated at 26E in FIGURES 11 and 12. The latter arrangement is disclosed in my United States Patents 2,885,711 and 3,046,808. The longitudinal raceways support the shaft against lateral forces. These longitudinal ball-type supporting means, as well as the driving nut 27 are of the recirculating ball type, as shown in the drawings. It will be seen that when torque is applied to the shaft 26 due to rotation of the nut and the angular force transmitted through the balls to the helical ball race (which torque is substantial due to the pitch of the helical groove) the stepped stop surfaces 66 of the collar 65 hold the keying plate or member 64 from turning, so that rotation of the driving nut 27 will then drive the shaft longitudinally. At the extreme limits of travel, however, longitudinal force on the shaft will be transmitted to the plate 64, either by the surface 68 at the upper ends of the flat keying surfaces 60F, which can urge the plate 64 downwardly, or by the pin 69 in and near the bottom of the shaft 26, which can urge the plate 64 upwardly.

It will be seen that plate 64 is limitedly vertically movable to the extent permitted by and is yieldably urged toward a centered position by a pair of opposed oppositely acting Belleville spring assemblies 71, 72. These are of like strength, the former urging the plate 64 upwardly and the latter urging it downwardly.

As shown in FIGURE 7, the shaft leg member 26 is fully retracted and cannot be moved further in the retracted direction. A reverse turning motion of a nut 27 will turn the member 26 and abutment plate 53A back into its clearing position wherein it may slide downwardly between the lugs 60, and at such times the lug portions 70 of plate 64 are centered between the stop surfaces 66 of the gate slot and yieldably positioned thereby the centering action of Belleville springs 71, 72. Continued rotation moves the abutment plate 53A downwardly through and to a position below the abutment members 61, and when plate 53A has in this manner moved to a position below portions 61, surface 68 contacts the top of plate 64 and moves it downwardly, compressing spring 71, thereby allowing the lug portions 70 to clear the stop surfaces 66, whereafter the plate 64 is rotated due to the torque on the shaft 26, to turn the abutment plate 53 to the underlying transverse position beneath the rigid supporting lugs 61, where it is again arrested by engagement of the lug 70 with the ends of the gate slots. Any axial loading thereafter applied on the mechanism when in this extended condition will be transmitted from shoe 48 and shaft 26 through plate 53A and lugs 61 to the cylinder and the supported load.

FIGURES 13–15 show the mechanism used as an operating means for movement of the landing gear on an aircraft and another modification is indicated in that the abutment portions 62 and 63 corresponding to the portions 60 and 61 of the embodiment last described, are located externally at the ends of the cylinder 74. In this embodiment, the mechanism is actuated by a motor and reduction gear assembly 75, and the complete actuator is mounted in trunnion supports to give flexibility of motion inasmuch as the swivel on the rear end of the assembly attached to the landing gear carriage must travel in an arc in performing its function in moving the landing gear from extended to a retracted position.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Extensible and retractable means for sustaining a compressive load comprising a casing adapted to be attached to a supported element, threadably interengageable, relatively rotatable nut and screw members carried by said casing, rotary driving means for inducing relative rotation of said members to effect axial displacement of one with relation to the other and with relation to the casing, keying portions inhibiting angular rotation of the non-rotatively driven member with respect to the casing throughout a substantial proportion of the travel of the displaceable member, gated portions of limited peripheral extent coacting with said keying portions and permitting limited angular rotation of the non-rotatively driven member at a predetermined position in the axial travel of said axially displaceable member, and supplemental load supporting abutment portions carried partly by the casing and partly by said axially displaceable member and movable into and out of axially overlapping positions in response to such limited angular rotation.

2. Extensible and retractable means for sustaining a compressive load comprising a casing adapted to be attached to a supported element, threadably interengageable, relatively rotatable nut and screw members carried by said casing, rotary driving means for inducing relative rotation of said members to effect axial displacement of one with relation to the other and with relation to the casing, keying portions inhibiting angular rotation of the axially displaceable member with respect to the casing throughout a substantial proportion of the travel of the latter, gated portions of limited peripheral extent coacting with said keying portions and permitting limited angular rotation of said axially displaceable member at a predetermined position in the axial travel thereof, and supplemental load supporting abutment portions carried partly by the casing and partly by said axially displaceable member and movable into and out of axially overlapping positions in response to such limited angular rotation.

3. Extensible and retractable means for sustaining a compressive load comprising a casing adapted to be attached to a supported element, threadably interengageable, relatively rotatable nut and screw members carried by said casing, rotary driving means for inducing relative rotation of said members to effect axial displacement of one with relation to the other and with relation to the casing, keying portions inhibiting angular rotation of the axially displaceable member with respect to the casing throughout a substantial proportion of the travel of the latter, gated portions of limited peripheral extent coacting with said keying portions and permitting limited angular rotation of said axially displaceable member at a predetermined position in the axial travel thereof, and non-concentric supplemental load supporting abutment portions carried partly by the casing and partly by said axially displaceable member and movable into and out of axially overlapped positions in response to such limited angular rotation.

4. Extensible and retractable means for sustaining a compressive load comprising a casing adapted to be attached to a supported element, threadably interengageable, relatively rotatable nut and screw members carried by said casing and limitedly axially movable as a unit with respect thereto, rotary driving means for inducing relative rotation of said members to effect axial displacement of one with relation to the other and with relation to the casing, keying portions inhibiting angular rotation of the axially displaceable member with respect to the casing throughout a substantial proportion of the travel of the latter, gated portions of limited peripheral extent coacting with said keying portions and permitting limited angular rotation of said axially displaceable member at a predetermined position in the axial travel thereof, and non-concentric supplemental load supporting abutment portions carried partly by the casing and partly by said axially displaceable member and movable into and out of axially overlapping positions in response to such limited angular rotation, said abutment portions being movable axially into and from engagement by such limited unitary axial movement of said members.

5. Extensible and retractable means for sustaining a compressive load comprising a casing adapted to be attached to a supported element, threadably interengageable, relatively rotatable nut and screw members carried by said casing and limitedly axially movable as a unit with respect thereto, rotary driving means for inducing relative rotation of said members to effect axial displacement of one with relation to the other and with relation to the casing, keying portions inhibiting angular rotation of the axially displaceable member with respect to the casing throughout a substantial proportion of the travel of the latter, gated portions of limited peripheral extent coacting with said keying portions and permitting limited angular rotation of said axially displaceable member at a predetermined position in the axial travel thereof, and non-concentric supplemental load supporting abutment portions carried partly by the casing and partly by said axially displaceable member and movable into and out of axially overlapped positions in response to such limited angular rotation, said abutment portions being movable axially into and from engagement by such limited unitary axial movement of said members, and means biasing said members to the limit of said unitary axial movement in the direction corresponding to extension of said axially displaceable member.

6. Extensible and retractable means for sustaining a compressive load comprising a casing adapted to be attached to a supported element, threadably interengageable, relatively rotatable nut and screw members carried by said casing and limitedly axially movable as a unit with respect thereto, rotary driving means for inducing relative rotation of said members to effect axial displacement of one with relation to the other and with relation to the casing, keying portions inhibiting angular rotation of the axially displaceable member with respect to the casing throughout a substantial proportion of the travel of the latter, gated portions of limited peripheral extent coacting with said keying portions and permitting limited angular rotation of said axially displaceable member at a predetermined position in the axial travel thereof, a non-concentric supplemental load supporting abutment portions carried partly by the casing and partly by said axially displaceable member and movable into and out of axially overlapped positions in response to such limited angular rotation, said abutment portions being movable axially into and from engagement by such limited unitary axial movement of said members, and means biasing said members in a direction tending to separate said abutment portions.

7. Extensible and retractable means for sustaining a compressive load or the like, comprising a support, relatively rotatable threadably interengaged nut and screw members, lost motion mounting means supporting said nut and screw members in said support for limited unitary movement in a direction parallel to the axis of the screw member, means opposing unitary rotation of said members and opposing independent axial travel of one only thereof, whereby relative rotation of said members tends to extend one with relation to the other, and supplemental supporting abutment portions carried partly by the support and partly by the extensible member and engageable and disengageable by such unitary axial movement.

8. Means as defined in claim 6 wherein one of said abutment portions is carried by the screw and also forms a part of said keying portions and another abutment portion is carried by the casing and also forms a part of said gated portions.

9. Means as defined in claim 6 wherein the screw is the displaceable and extensible member and one of said abutment portions is rigidly affixed to the screw and another is rigidly carried by the casing, said gated portions including a ring portion supported in the casing, lug means on the screw permitting limited angular movement relatively between the ring and the screw, interengageable gate-defining portions on the ring and screw, the limits of angular movement of the lug means and ring limiting the rotation of the screw at positions defining said axially overlapping and non-overlapping positions of the abutment portions.

10. Means as defined in claim 6 wherein the screw is the displaceable and extensible member and one of said abutment portions is rigidly affixed to the screw and another is rigidly carried by the casing, said gated portions including a ring portion supported in the casing for limited axial movement relatively thereto and positioned coaxially with respect to the screw, lug means on the screw and interengageable gate-defining portions on the ring permitting limited relative angular movement of the ring and screw, the limits of angular movement of the ring limiting the rotation of the screw at positions defining said axially overlapping and non-overlapping positions of the abutment portions.

11. Means as defined in claim 6 wherein the screw is the displaceable and extensible member and one of said abutment portions is rigidly affixed to the screw and another is rigidly carried by the casing, said gated portions including a ring portion supported in the casing for limited axial and limited angular movement relatively thereto and positioned coaxially with respect to the screw, interengageable gate-defining portions on the ring and screw, the limits of angular movement of the ring limiting the rotation of the screw at positions defining said axially overlapping and non-overlapping positions of the abutment portions, and means yieldably biasing said ring in a mid portion of its range of axial travel.

12. Means as defined in claim 2 wherein said nut and screw members are of the recirculating ball type.

13. Means as defined in claim 7 wherein said nut and screw members are of the recirculating ball type.

14. Means as defined in claim 2 wherein said nut and screw members are of the recirculating ball type, helical ball race portions and keying portions of substantially the same radial depth formed in the surface of the screw member.

15. Means as defined in claim 7 wherein said nut and screw members are of the recirculating ball type, helical ball race portions and keying portions of substantially the same radial depth formed in the surface of the screw member.

16. Means as defined in claim 2 wherein said nut and screw members are of the recirculating ball type, the displaceable member having a helical ball track with a pitch angle of between 5 and 85°.

17. Means as defined in claim 7 wherein said nut and screw members are of the recirculating ball type, the displaceable member having a helical ball track with a pitch angle of between 5 and 85°.

18. Means as defined in claim 2 wherein said nut and screw members are of the recirculating ball type, and helical ball race portions and keying portions of substantially the same radial depth formed in the surface of the screw member, the displaceable member having a helical ball track with a pitch angle of between 5 and 85°.

19. Means as defined in claim 7 wherein said nut and screw members are of the recirculating ball type, helical ball race portions and keying portions of substantially the same radial depth formed in the surface of the screw member, the displaceable member having a helical ball track with a pitch angle of between 5 and 85°.

References Cited by the Examiner

UNITED STATES PATENTS

| | | | |
|---|---|---|---|
| 2,623,403 | 12/1952 | Terdina | 74—424.8 |
| 2,640,365 | 6/1953 | Michie | 308—6 |
| 2,655,340 | 10/1953 | Dalton | 254—86 |
| 2,890,594 | 6/1959 | Galonska | 74—424.8 |

FOREIGN PATENTS 327,704  4/1930  Great Britain.

DON A. WAITE, *Primary Examiner.*

BROUGHTON G. DURHAM, *Examiner.*